United States Patent
Lim

(10) Patent No.: US 12,221,175 B2
(45) Date of Patent: Feb. 11, 2025

(54) APPARATUS AND METHOD FOR COMPENSATING FOR STICK-SLIP OF MOTOR DRIVEN POWER STEERING SYSTEM

(71) Applicant: HYUNDAI MOBIS CO., LTD., Seoul (KR)

(72) Inventor: Kyoung Soo Lim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 414 days.

(21) Appl. No.: 16/808,256

(22) Filed: Mar. 3, 2020

(65) Prior Publication Data

US 2020/0298907 A1   Sep. 24, 2020

(30) Foreign Application Priority Data

Mar. 19, 2019   (KR) .................. 10-2019-0031089

(51) Int. Cl.
*B62D 5/04*   (2006.01)
*B62D 1/16*   (2006.01)
*B62D 15/02*   (2006.01)

(52) U.S. Cl.
CPC ............ *B62D 5/0463* (2013.01); *B62D 1/16* (2013.01); *B62D 15/021* (2013.01)

(58) Field of Classification Search
CPC ........ B62D 5/0463; B62D 6/008; B62D 6/02; B62D 6/08; B62D 6/00; B62D 6/10; B62D 6/002; B62D 15/025; B62D 5/0421; B60W 10/20
See application file for complete search history.

(56) References Cited

U.S. PATENT DOCUMENTS

| | | |
|---|---|---|
| 9,527,523 B2 | 12/2016 | Chae et al. |
| 10,604,181 B2 | 3/2020 | Endo |
| 2013/0179039 A1* | 7/2013 | Uryu .................. B62D 6/00 701/42 |

(Continued)

FOREIGN PATENT DOCUMENTS

| | | |
|---|---|---|
| JP | 6229821 | 11/2017 |
| KR | 10-1560980 | 10/2015 |

OTHER PUBLICATIONS

Korean Office Action dated Apr. 26, 2023, in Korean Patent Application No. 10-2019-0031089.

*Primary Examiner* — Kenneth J Malkowski
*Assistant Examiner* — Carville Albert Hollingsworth, IV
(74) *Attorney, Agent, or Firm* — NSIP Law

(57) ABSTRACT

An apparatus for compensating for a stick-slip of a Motor Driven Power Steering (MDPS) system may include: a column torque detection unit to detect column torque applied to a steering shaft as a driver operates a steering wheel; a vehicle speed sensor to detect vehicle speed; a steering angular velocity detection unit to detect a steering angular velocity of a steering wheel; a condition determination unit to determine whether at least one of the column torque, the vehicle speed and the steering angular velocity satisfies a preset compensation condition; a stick-slip compensation controller to output a compensation current for compensating the stick-slip using at least one of the steering angular velocity, the column torque and the vehicle speed; and a compensation unit to compensate for an output of an MDPS controller by applying the compensation current to the output of the MDPS controller.

10 Claims, 4 Drawing Sheets

(56) References Cited

U.S. PATENT DOCUMENTS

| | | | |
|---|---|---|---|
| 2014/0188337 A1* | 7/2014 | Pyo | B62D 6/10 |
| | | | 701/41 |
| 2014/0297123 A1* | 10/2014 | Nozawa | B62D 5/0463 |
| | | | 701/41 |
| 2016/0362130 A1* | 12/2016 | Hwa | B62D 5/0421 |
| 2018/0237056 A1* | 8/2018 | Bremkens | G01L 5/0042 |
| 2019/0337562 A1* | 11/2019 | Endo | B62D 5/0472 |
| 2020/0180678 A1* | 6/2020 | Watanabe | B62D 6/002 |
| 2020/0317259 A1* | 10/2020 | Fraison | G01L 5/221 |
| 2020/0385052 A1* | 12/2020 | Sakaguchi | B62D 5/0463 |
| 2021/0226507 A1* | 7/2021 | Hamada | H01R 12/57 |

* cited by examiner

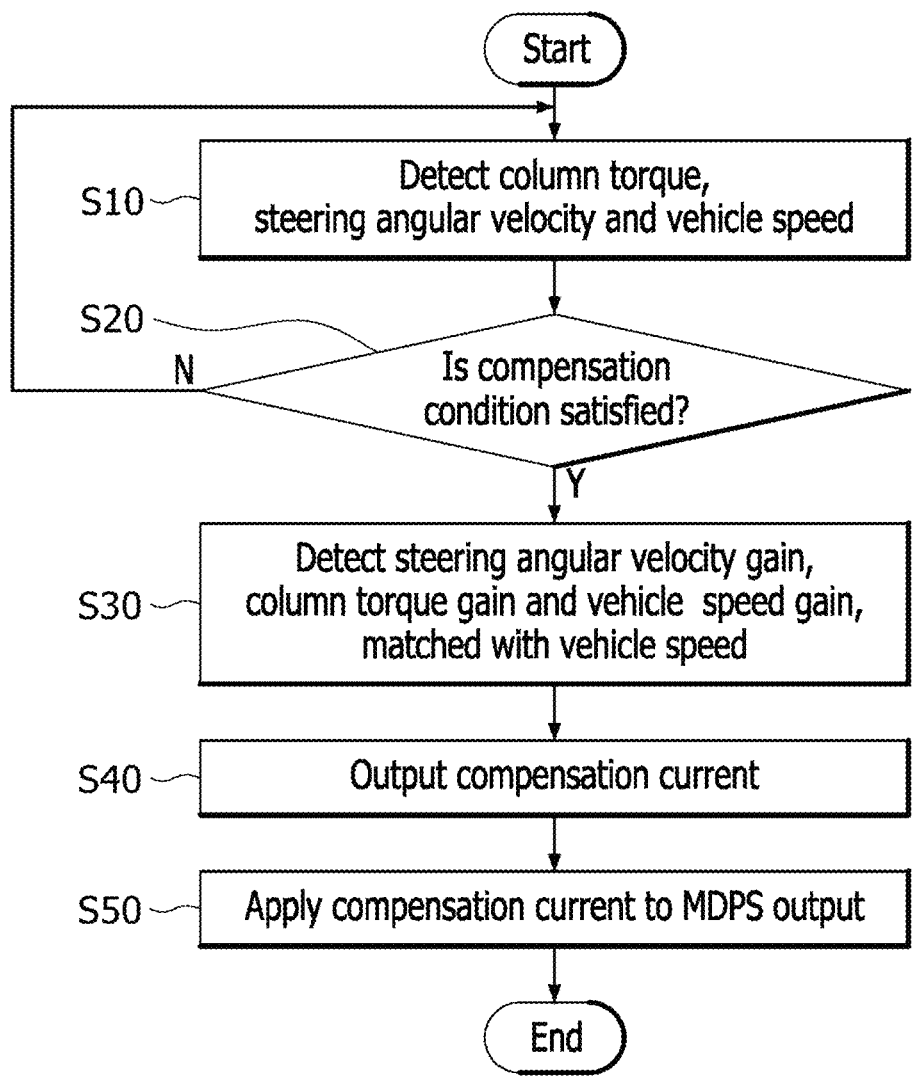

APPARATUS AND METHOD FOR COMPENSATING FOR STICK-SLIP OF MOTOR DRIVEN POWER STEERING SYSTEM

CROSS-REFERENCE TO RELATED APPLICATION

This application claims priority from and the benefit of Korean Patent Application No. 10-2019-0031089 filed on Mar. 19, 2019, which is hereby incorporated by reference for all purposes as if set forth herein.

BACKGROUND

Field

Exemplary embodiments relate to an apparatus and method for compensating for a stick-slip of an MDPS (Motor Driven Power Steering) system, and more particularly, to an apparatus and method for compensating for a stick-slip of an MDPS system, which can compensate for a stick-slip which occurs when a steering wheel is rotated from either end to the center, depending on the mileage of a vehicle.

Discussion of the Background

The MDPS system has a lower weight and occupies a smaller space than an existing hydraulic power steering system, and requires no oil change unlike the existing hydraulic power steering system. The MDPS system provides a part of steering torque which a driver needs to apply to a steering wheel during a steering operation, using an auxiliary power source, and thus enables the driver to easily perform the steering operation.

That is, a torque sensor directly connected to the steering wheel senses a steering intention of the driver, and the MDPS system receives the sensed signal and drives a motor to provide a proper force in consideration of the current speed of a vehicle and the like, thereby assisting a steering force. When the vehicle is stopped or parked or driven at low speed, the MDPS system assists a large force to lessen the driver's force. When the vehicle is driven at high speed, the MDPS system assists only a small force to maintain the stability of vehicle body.

In the MDPS system, however, a worm decelerator may be damaged by a mechanical problem of the MDPS system which occurs with the increase in mileage of a vehicle. Thus, when the steering wheel is rotated from either end to the center, a stick-slip may occur to degrade the steering performance.

The above information disclosed in this Background section is only for enhancement of understanding of the background of the invention and, therefore, it may contain information that does not constitute prior art.

SUMMARY

Exemplary embodiments of the present invention are directed to an apparatus and method for compensating for a stick-slip of an MDPS (Motor Driven Power Steering) system, which can compensate for a stick-slip which occurs when a steering wheel is rotated from either end to the center, depending on the mileage of a vehicle, thereby improving steering performance.

Also, various embodiments are directed to an apparatus and method for compensating for a stick-slip of an MDPS system, which can reduce a part replacement cost which may be cause by an occurrence of stick-slip in the MDPS system.

In an embodiment, an apparatus for compensating for a stick-slip of an MDPS (Motor Driven Power Steering) system may include: a column torque detection unit configured to detect column torque applied to a steering shaft as a driver operates a steering wheel; a vehicle speed sensor configured to detect vehicle speed; a steering angular velocity detection unit configured to detect a steering angular velocity of a steering wheel; a condition determination unit configured to determine whether at least one of the column torque, the vehicle speed and the steering angular velocity satisfies a preset compensation condition; a stick-slip compensation controller configured to output a compensation current for compensating the stick-slip using at least one of the steering angular velocity, the column torque and the vehicle speed, according to the determination result of the condition determination unit; and a compensation unit configured to compensate for an output of an MDPS controller by applying the compensation current to the output of the MDPS controller.

When the steering angle is not changed and the column torque is equal to or more than a preset column torque setting value while the vehicle travels straight ahead, the condition determination unit may determine that the compensation condition is satisfied.

When the steering angle is equal to or less than a steering angle setting value while the MDPS is turned off, the condition determination unit may determine that the compensation condition is satisfied.

The stick-slip compensation controller may include: a steering angular velocity gain detection unit configured to detect a preset steering angular velocity gain matched with the vehicle speed; a column torque gain detection unit configured to detect a preset column torque gain matched with the vehicle speed; a vehicle speed gain detection unit configured to detect a preset vehicle speed gain matched with the vehicle speed; and a compensation current output unit configured to calculate a compensation gain using the steering angular velocity gain, the column torque gain and the vehicle speed gain, and apply the compensation current by the compensation gain to the compensation unit.

The compensation unit may add an output of the compensation unit to the output of the MDPS controller.

In an embodiment, a method for compensating for a stick-slip of an MDPS may include: determining, by a condition determination unit, whether at least one of column torque, vehicle speed and steering angular velocity satisfies a preset compensation condition; detecting, by a stick-slip compensation controller, a compensation gain for compensating for the stick-slip using at least one of the steering angular velocity, the column torque and the vehicle speed, according to the determination result of the condition determination unit, and outputting a compensation current through the compensation gain; and compensating for, by a compensation unit, an output of an MDPS controller by applying the compensation current to the output of the MDPS controller.

The determining of whether at least one of the column torque, the vehicle speed and the steering angular velocity satisfies the preset compensation condition may include determining that the compensation condition is satisfied, when the steering angle is not changed and the column torque is equal to or more than a preset column torque setting value.

The determining of whether at least one of the column torque, the vehicle speed and the steering angular velocity satisfies the preset compensation condition may include determining that the compensation condition is satisfied, when the steering angle is equal to or less than a steering angle setting value while the MDPS system is turned off.

In the outputting of the compensation current, a steering angular velocity gain detection unit may detect a preset steering angular velocity gain matched with the vehicle speed, a column torque gain detection unit may detect a preset column torque gain matched with the vehicle speed, a vehicle speed gain detection unit may detect a preset vehicle speed gain matched with the vehicle speed, and a compensation current output unit may calculate a compensation gain using the steering angular velocity gain, the column torque gain and the vehicle speed gain, and apply the compensation current by the compensation gain to the compensation unit.

The compensating for the output of the MDPS controller may include adding an output of the compensation unit to the output of the MDPS controller.

In accordance with the embodiments of the present disclosure, the apparatus and method for compensating for a stick-slip of an MDPS system can improve the steering performance by compensating for a stick-slip which occurs when the steering wheel is rotated from either end to the center, depending on the mileage of the vehicle.

Furthermore, apparatus and method for compensating for a stick-slip of an MDPS system can reduce a part replacement cost caused by the occurrence of stick-slip in the MDPS system.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 4 is a flowchart illustrating a method for compensating for a stick-slip of an MDPS system in accordance with an embodiment of the present disclosure.

DETAILED DESCRIPTION OF THE ILLUSTRATED EMBODIMENTS

Hereinafter, an apparatus and method for compensating for stick-slip of an MDPS (Motor Driven Power Steering) system will be described below with reference to the accompanying drawings through various examples of embodiments. It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

As is customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Figure 1:
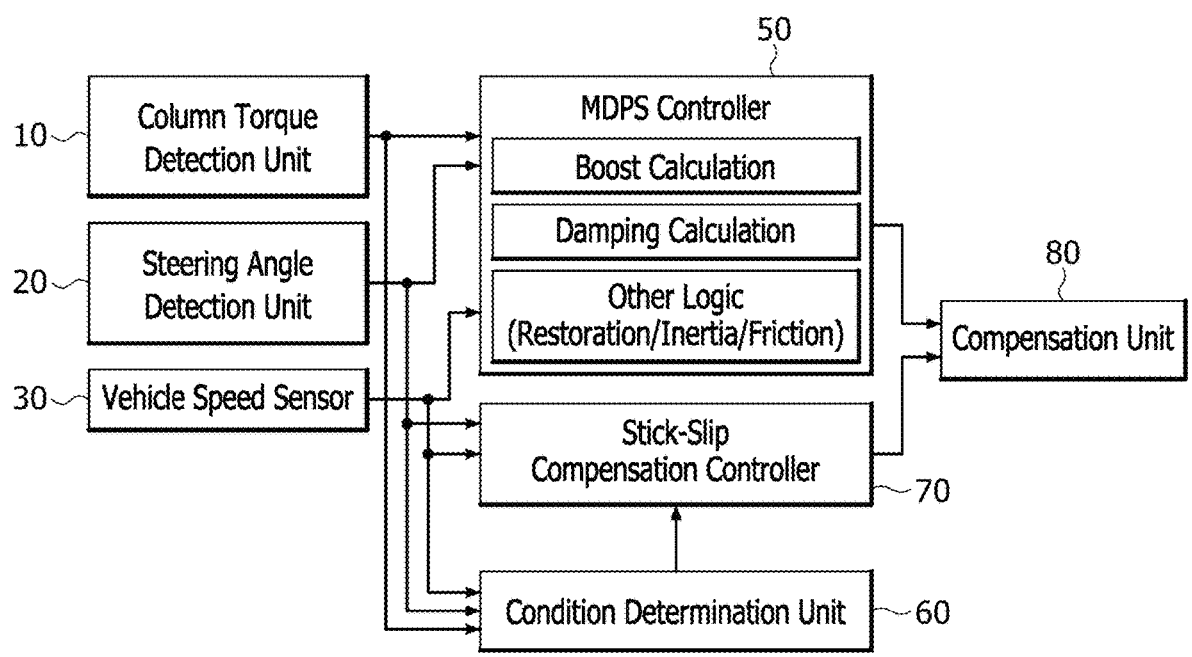
FIG. 1 is a block diagram illustrating an apparatus for compensating for a stick-slip of an MDPS (Motor Driven Power Steering) system in accordance with an embodiment of the present disclosure.
Figure 2:
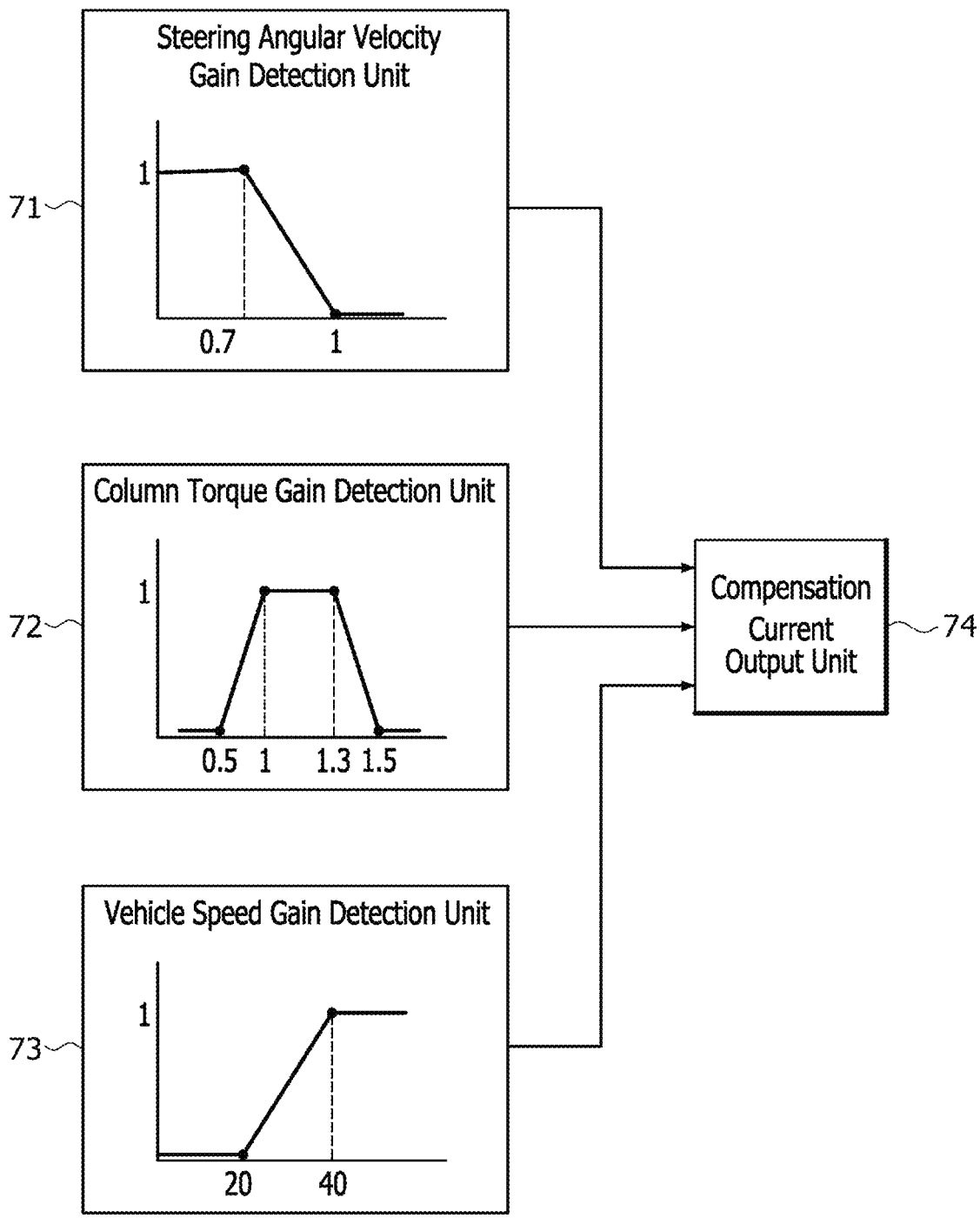
FIG. 2 is a block diagram illustrating a stick-slip compensation controller in accordance with the embodiment of the present disclosure.
Figure 3:
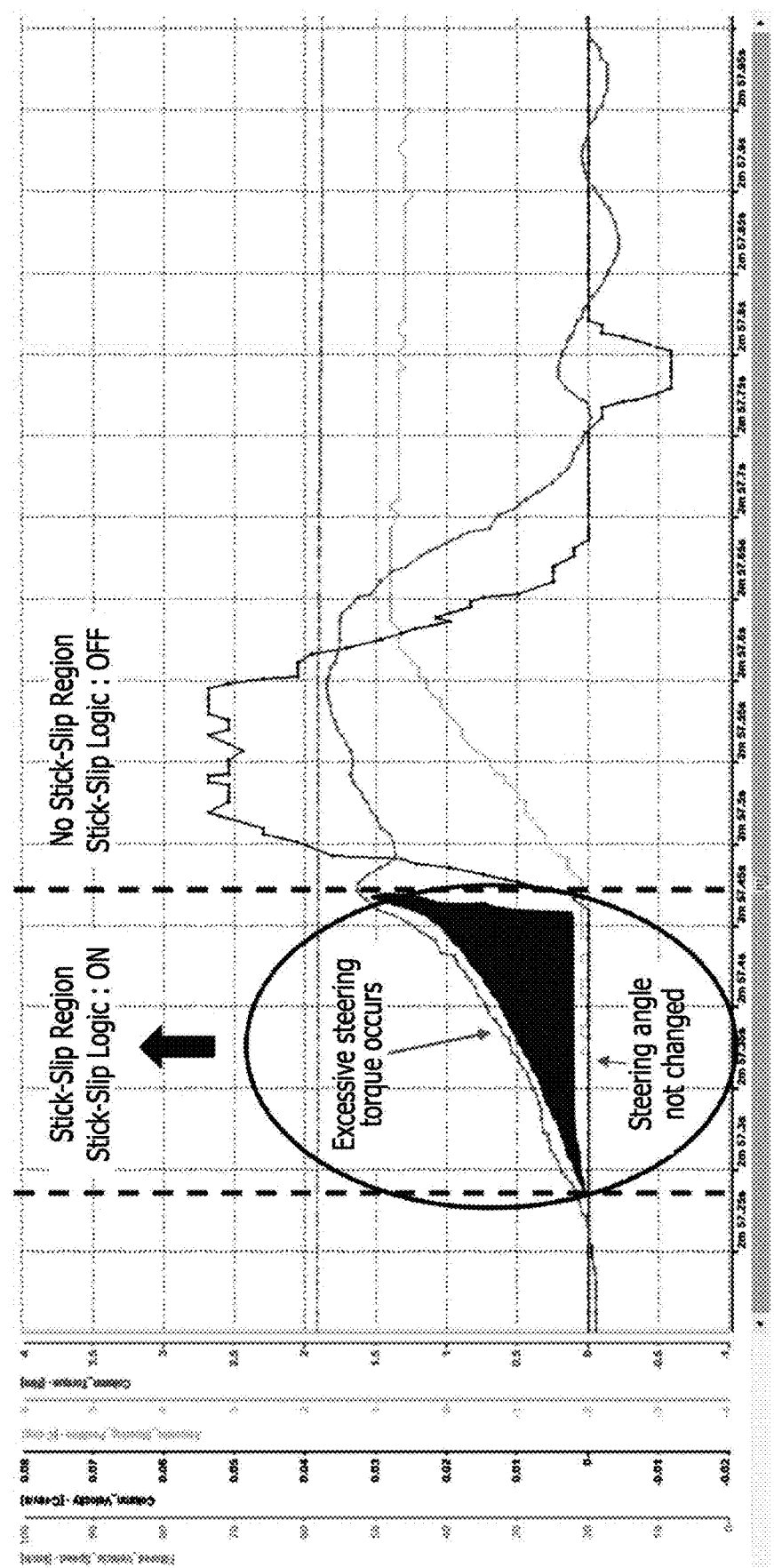
FIG. 3 is a graph illustrating a change in steering angle before and after a stick-slip occurs, in accordance with the embodiment of the present invention.

FIG. 1 is a block diagram illustrating an apparatus for compensating for a stick-slip of an MDPS system in accordance with an embodiment of the present disclosure, FIG. 2 is a block diagram illustrating a stick-slip compensation controller in accordance with the embodiment of the present disclosure, and FIG. 3 is a graph illustrating a change in steering angle before and after a stick-slip occurs, in accordance with the embodiment of the present invention.

Referring to FIG. 1, the apparatus for compensating for a stick-slip of an MDPS system in accordance with the embodiment of the present disclosure includes a column torque detection unit 10, a steering angle detection unit 20, a vehicle speed sensor 30, an MDPS controller 50, a stick-slip compensation controller 70, a condition determination unit 60 and a compensation unit 80.

The column torque detection unit 10 detects column torque which is applied to a steering shaft as a driver operates a steering wheel.

The steering angle detection unit 20 may detect a steering angular velocity of the steering wheel. The steering angle detection unit 20 may include an optical sensor to detect the steering angular velocity, or detect the steering angular velocity by measuring a steering angle and differentiating the measured steering angle with respect to time.

The vehicle speed sensor 30 senses the driving speed of a vehicle in operation. The vehicle speed sensor 30 may include various types of sensors such as a sensor for detecting vehicle speed using rotation speed of a wheel, a sensor for detecting vehicle speed by measuring an engine RPM (Revolution Per Minute), and a sensor for detecting vehicle speed using the GPS (Global Positioning System).

The MDPS controller 50 outputs a motor control current for controlling an MDPS motor using the column torque, the steering angle and the vehicle speed, which are detected by the column torque detection unit 10, the steering angle detection unit 20 and the vehicle speed sensor 30, respectively. According to such a motor control current, the MDPS motor is driven to generate an assist steering force for assisting the driver's steering force.

That is, the MDPS controller 50 receives the steering angle sensed by the steering angle sensor, the vehicle speed sensed by the vehicle speed sensor 30, and the column torque, calculates a damping force based on the column torque and the steering angular velocity by the vehicle speed, calculates a boost as a parameter for calculating output torque for the column torque, calculates restoration, inertia and friction of the steering wheel, and generates the motor control current based on the calculated values.

The operation of the MDPS controller 50 to generate the motor control current is not specifically limited, and various methods for generating a motor control current to generate an assist steering force in the MDPS system may be all employed.

The condition determination unit 60 determines whether at least one of the column torque, the vehicle speed and the steering angular velocity, detected by the column torque detection unit 10, the vehicle speed sensor 30 and the steering angle detection unit 20, respectively, satisfies a preset compensation condition.

That is, the condition determination unit 60 determines whether at least one of the steering angle and the column torque satisfies the compensation condition, while the vehicle travels straight ahead. For example, when the steering wheel is slightly operated while the vehicle travels straight ahead under an actual vehicle condition, the condition determination unit 60 determines that the compensation condition is satisfied, in the case that the steering angle is not changed and a change in column torque is equal to or more than a column torque setting value.

The column torque setting value is a column torque value serving as a reference value through which it may be determined that stick-slip occurred when the steering wheel was slightly operated while the vehicle was traveling straight ahead under the actual vehicle condition.

The condition determination unit 60 determines whether the steering angle satisfies the preset compensation condition, in a complete steering state in which the MPDS system is turned off. For example, when the steering angle is equal to or less than a steering angle setting value in the complete steering state in which the MPDS system is turned off, the condition determination unit 60 determines that the steering angle satisfies the preset compensation condition.

Here, the steering angle setting value is a steering value serving as a reference value through which it may be determined that a stick-slip occurred in the complete steering state in which the MDPS was turned off. For example, the steering angle setting value may be set to 0.3 deg.

When the determination result of the condition determination unit 60 indicates that at least one of the column torque, the vehicle speed and the steering angular velocity satisfies the compensation condition, the stick-slip compensation controller 70 outputs a compensation current for compensating for a stick-slip using at least one of the steering angular velocity, the column torque and the vehicle speed.

Referring to FIG. 2, the stick-slip compensation controller 70 includes a steering angular velocity gain detection unit 71, a column torque gain detection unit 72, a vehicle speed gain detection unit 73 and a compensation current output unit 74.

The steering angular velocity gain detection unit 71 detects a preset steering angular velocity gain matched with the vehicle speed.

The column torque gain detection unit 72 detects a preset column torque gain matched with the vehicle speed.

The vehicle speed gain detection unit 73 detects a preset vehicle speed gain matched with the vehicle speed.

That is, each of the steering angular velocity gain, the column torque gain and the vehicle speed gain may be matched with the vehicle speed, and set to various values depending on the vehicle speed.

The compensation current output unit 74 calculates a compensation gain by multiplying the steering angular velocity gain, the column torque gain and the vehicle speed gain, detected by the steering angular velocity gain detection unit 71, the column torque gain detection unit 72 and the vehicle speed gain detection unit 73, respectively, and applies a compensation current by the compensation gain to the compensation unit 80.

The compensation unit 80 compensates for an output of the MDPS controller 50 by applying the compensation current to the output of the MDPS controller 50.

That is, when the compensation current is inputted from the compensation current output unit 74, the compensation unit 80 calibrates the motor control current by adding the compensation current to the output of the MDPS system, i.e. the motor control current, and applies the calibrated motor control current to the motor. Thus, the motor may be driven according to the motor control current inputted from the compensation unit 80, and thus remove the stick-slip.

Hereafter, a method for compensating for a stick-slip of an MDPS system in accordance with an embodiment of the present disclosure will be described in detail with reference to FIG. 4.

FIG. 4 is a flowchart illustrating a method for compensating for a stick-slip of an MDPS system in accordance with an embodiment of the present disclosure.

Referring to FIG. 4, the column torque detection unit 10 detects column torque applied to the steering shaft as a driver operates the steering wheel, the steering angle detection unit 20 detects a steering angle and steering angular velocity of the steering wheel, and the vehicle speed sensor 30 detects driving speed of the vehicle in operation, in step S10.

The MDPS controller 50 outputs a motor control current for controlling the MDPS motor using the column torque, the steering angle and the vehicle speed, detected by the column torque detection unit 10, the steering angle detection unit 20 and the vehicle speed sensor 30, respectively.

As the steering angular velocity, the column torque and the vehicle speed are detected, the condition determination unit 60 determines whether at least one of the steering angular velocity, the column torque and the vehicle speed satisfies a preset compensation condition, in step S20.

For example, when the steering wheel is slightly operated while the vehicle travels straight ahead under the actual vehicle condition, the condition determination unit 60 determines that the compensation condition is satisfied, in the case that the steering angle is not changed, a change in column torque is equal to or more than the column torque setting value, and the steering angle is equal to or less than the steering angle setting value in the complete steering state in which the MDPS system is turned off.

When the condition determination unit 60 determines that the compensation condition is satisfied, the stick-slip compensation controller 70 calculates a compensation gain using at least one of the steering angular velocity, the column torque and the vehicle speed, and applies a compensation current by the calculated compensation gain to the compensation unit 80, in step S40.

That is, the steering angular velocity gain detection unit 71 detects a preset steering angular velocity gain matched with the vehicle speed, the column torque gain detection unit 72 detects a preset column torque gain matched with the vehicle speed, and the vehicle speed gain detection unit 73 detects a preset vehicle speed gain matched with the vehicle speed.

Then, the compensation current output unit 74 calculates a compensation gain by multiplying the steering angular velocity gain, the column torque gain and the vehicle speed gain, which are detected as described above, and applies the compensation current by the calculated compensation gain to the compensation unit 80.

Thus, the compensation unit 80 calibrates a motor control current by adding the compensation current to an output of the MDPS controller 50, i.e. the motor control current, and applies the calibrated motor control current to the motor, in step S50.

In accordance with the embodiments of the present disclosure, the apparatus and method for compensating for a stick-slip of an MDPS system can improve the steering performance by compensating for a stick-slip which occurs when the steering wheel is rotated from either end to the center, depending on the mileage of the vehicle, and reduce a part replacement cost caused by the occurrence of stick-slip in the MDPS system.

Although preferred embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. An apparatus for compensating for a stick-slip of a Motor Driven Power Steering (MDPS) system of a vehicle, comprising:
    a column torque detection unit including a processor configured to detect column torque applied to a steering shaft of the vehicle as a driver operates a steering wheel of the vehicle;
    a vehicle speed sensor configured to detect vehicle speed;
    a steering angle detection unit including a processor configured to detect a steering angle and steering angular velocity of a steering wheel;
    a condition determination unit including a processor configured to determine whether at least one of the column torque, the vehicle speed and the steering angular velocity satisfies a preset compensation condition as a determination result, the preset compensation condition comprising a state in which the steering wheel is being operated as the vehicle is traveling straight ahead, or state in which the MDPS system is turned off;
    a stick-slip compensation controller configured to:
        output a compensation current for compensating a determined stick-slip of the MDPS system based on at least one of the steering angular velocity, the column torque, and the vehicle speed, according to the determination result of the condition determination unit, wherein the stick-slip occurs by as the steering wheel being is rotated from either end to the center; and
    a compensation unit including a processor configured to:
        compensate for an output of an MDPS controller by applying the compensation current to the output of the MDPS controller; and
        calibrate a motor control current by adding the compensation current to the output of the MDPS system and apply the calibrated motor control current to the motor, to compensate for the stick-slip.

2. The apparatus of claim 1, wherein the condition determination unit determines that the compensation condition is a steering angle not being changed and the column torque being equal to or more than a preset column torque setting value as the vehicle travels straight ahead.

3. The apparatus of claim 1, wherein the condition determination unit determines that the compensation condition is a steering angle being equal to or less than a steering angle setting value.

4. The apparatus of claim 1, wherein the stick-slip compensation controller comprises:
    a steering angular velocity gain detection unit including a processor configured to detect a preset steering angular velocity gain matched with the vehicle speed;
    a column torque gain detection unit including a processor configured to detect a preset column torque gain matched with the vehicle speed;
    a vehicle speed gain detection unit including a processor configured to detect a preset vehicle speed gain matched with the vehicle speed; and
    a compensation current output unit including a processor configured to calculate a compensation gain using the steering angular velocity gain, the column torque gain and the vehicle speed gain, and apply the compensation current by the compensation gain to the compensation unit.

5. The apparatus of claim 1, wherein the compensation unit adds an output of the compensation unit to the output of the MDPS controller.

6. A method for compensating for a stick-slip of a Motor Driven Power Steering (MDPS) system of a vehicle, the method comprising:
    determining, by a condition determination unit including a processor, whether at least one of a column torque applied to a steering shaft of the vehicle, a vehicle speed, and a steering angular velocity of a steering wheel of the vehicle satisfies a preset compensation condition as a determination result, the preset compensation condition comprising a state in which the steering wheel is being operated as the vehicle is traveling straight ahead, or state in which the MDPS system is turned off;
    detecting, by a stick-slip compensation controller, a compensation gain for compensating for a determined stick-slip of the MDPS system based on at least one of the steering angular velocity, the column torque and the vehicle speed, according to the determination result of the condition determination unit, and outputting a compensation current through the compensation gain, wherein the stick-slip occurs as the steering wheel is rotated from either end to the center;
    compensating for, by a compensation unit including a processor, an output of an MDPS controller by applying the compensation current to the output of the MDPS controller; and
    calibrating a motor control current by adding the compensation current to the output of the MDPS system and applying the calibrated motor control current to a motor of the MDPS system, to compensate for the stick-slip.

7. The method of claim 6, wherein the determining of whether at least one of the column torque, the vehicle speed, and the steering angular velocity satisfies the preset compensation condition comprises determining that the compensation condition is a steering angle that is not being changed and the column torque is equal to or more than a preset column torque setting value.

8. The method of claim 6, wherein the determining of whether at least one of the column torque, the vehicle speed, and the steering angular velocity satisfies the preset compensation condition comprises determining that the compensation condition is a steering angle that is equal to or less than a steering angle setting value.

9. The method of claim 6, wherein in the outputting of the compensation current, a steering angular velocity gain detection unit detects a preset steering angular velocity gain matched with the vehicle speed, a column torque gain detection unit detects a preset column torque gain matched with the vehicle speed, a vehicle speed gain detection unit detects a preset vehicle speed gain matched with the vehicle speed, and a compensation current output unit calculates a compensation gain using the steering angular velocity gain, the column torque gain and the vehicle speed gain, and applies the compensation current by the compensation gain to the compensation unit.

10. The method of claim 6, wherein the compensating for the output of the MDPS controller comprises adding an output of the compensation unit to the output of the MDPS controller.

* * * * *